United States Patent
Sanders

(10) Patent No.: US 7,245,819 B1
(45) Date of Patent: Jul. 17, 2007

(54) CROSS-FILE DVR RECORD PADDING PLAYBACK

(75) Inventor: Scott D. Sanders, Union City, CA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 10/395,770

(22) Filed: Mar. 24, 2003

(51) Int. Cl.
*H04N 5/91* (2006.01)

(52) U.S. Cl. .......................................... 386/46; 386/83

(58) Field of Classification Search .................. 386/46, 386/52, 83, 95, 111, 112, 125, 126; 725/86, 725/87, 94; 705/50, 57, 59; 707/10, 200, 707/202
See application file for complete search history.

(56) References Cited

U.S. PATENT DOCUMENTS

| | | | | |
|---|---|---|---|---|
| 5,412,801 A | * | 5/1995 | de Remer et al. ............. 707/10 |
| 6,038,367 A | * | 3/2000 | Abecassis ..................... 386/46 |
| 6,792,617 B2 | * | 9/2004 | Gorbatov et al. ............. 386/83 |
| 6,829,781 B1 | * | 12/2004 | Bhagavath et al. ........... 725/94 |
| 7,003,213 B1 | * | 2/2006 | Hasegawa ..................... 386/83 |
| 7,024,427 B2 | * | 4/2006 | Bobbitt et al. .............. 707/200 |
| 7,155,415 B2 | * | 12/2006 | Russell et al. ................ 705/59 |

* cited by examiner

*Primary Examiner*—John Miller
*Assistant Examiner*—Christopher Onuaku
(74) *Attorney, Agent, or Firm*—Lee & Hayes, PLLC

(57) ABSTRACT

Described herein is an exemplary system and related methods for cross-file DVR record padding playback. The exemplary system can recover program fragments lost by intentionally or unintentionally padding programs during recording.

37 Claims, 7 Drawing Sheets

CROSS-FILE DVR RECORD PADDING PLAYBACK

TECHNICAL FIELD

This invention relates generally to multimedia recording and specifically to cross-file digital video record padding playback.

BACKGROUND

In a digital video recording (DVR) environment, DVR software records multimedia programs for later replay or archiving (as described herein, digital video recording may include audio and other information, such as program metadata). Ideally, each recording of a program is stored in an independent digital file. For instance, a recording of the "The West Wing" television program is ideally stored in its own file on a hard disk. When multiple programs are recorded back-to-back on the same channel, each program from the multimedia stream is stored in a separate digital file despite the fact that the recording appears continuous from the perspective of a human user.

DVRs and personal video recorders (PVRs) sometimes add extra recording time before and after a program being recorded (pre-padding and post-padding) to ensure that the entire program is recorded. This automatic padding before and after a program is usually referred to as "soft" padding because it is added only if it would not interfere with the recording of another program. This pre-padding and post-padding can prevent lost program content due to inaccurate broadcaster scheduling, an inaccurate clock, and other irregularities. For instance, if the policy of the DVR software is to append five minutes of pre and post padding to a program that does not immediately follow or precede another program being recorded on the same tuner, then the DVR records for an additional ten minutes over the length of the program, five minutes before and five minutes after. Some DVRs also allow the user to select "hard" padding, in which a selected time period of pre and/or post padding can be appended to a recorded program, sometimes even regardless of programs to be recorded immediately preceding or following the subject program. This hard padding can give rise to prioritization of adjacent programs to be recorded and subsequent truncation of the programs with lower priority.

Usually, when two programs are scheduled to be recorded back-to-back using the same tuner, the DVR does not intentionally apply any padding but instead makes a "judgement call" regarding the point in time at which the first of the adjacent programs ends and its digital storage file is closed, and the subsequent program begins and its digital storage file is opened. The discernment of when a first program ends and the next program begins is usually satisfactory since it is based on the broadcaster's scheduled time listings. Not infrequently, however, the DVR places the demarcation between adjacently recorded programs at the wrong place. This can be due to inaccuracies in the schedule listings information, clock inaccuracies, or unpredictability of program length, for example, in the case of a live sporting event that extends past an anticipated finish time. When the temporal dividing line between programs is applied inaccurately, an unintentional padding occurs. If the temporal division between programs is made too early, then the ending of the first program is truncated from the digital file storing the first program, and this ending of the first program becomes unintended pre-padding for the following program. If the temporal division between programs is made too late, then the beginning of the subsequent program is truncated from the digital file storing the subsequent program and becomes unintended post-padding for the first program. In either case, the truncated portion of a program is generally lost to DVR tracking, unless the sequence of program recording is manually reconstructed by the user and the unintentional pre or post padding is located and played back to retrieve the lost part of the program.

SUMMARY

Described herein is an exemplary system and related methods for cross-file DVR record padding playback. The exemplary system recovers program fragments lost by padding, by inaccurate temporal division between programs and their files during recording, and by other processes that divide programs across multiple digital files.

In one implementation the exemplary system assigns identifiers to each temporally adjacent file during file creation. Programs can then be reconstructed from identified program fragments.

In an exemplary related method, program fragments from multiple files are combined and rewritten into a single program in a single digital file.

DETAILED DESCRIPTION

Overview

Subject matter includes an exemplary system and related methods for recording, storing, and playing back multimedia programs ("programs") stored in DVRs and other devices, such as PVRs, that store multimedia content in digital files (collectively, "DVRs").

Figure 1:
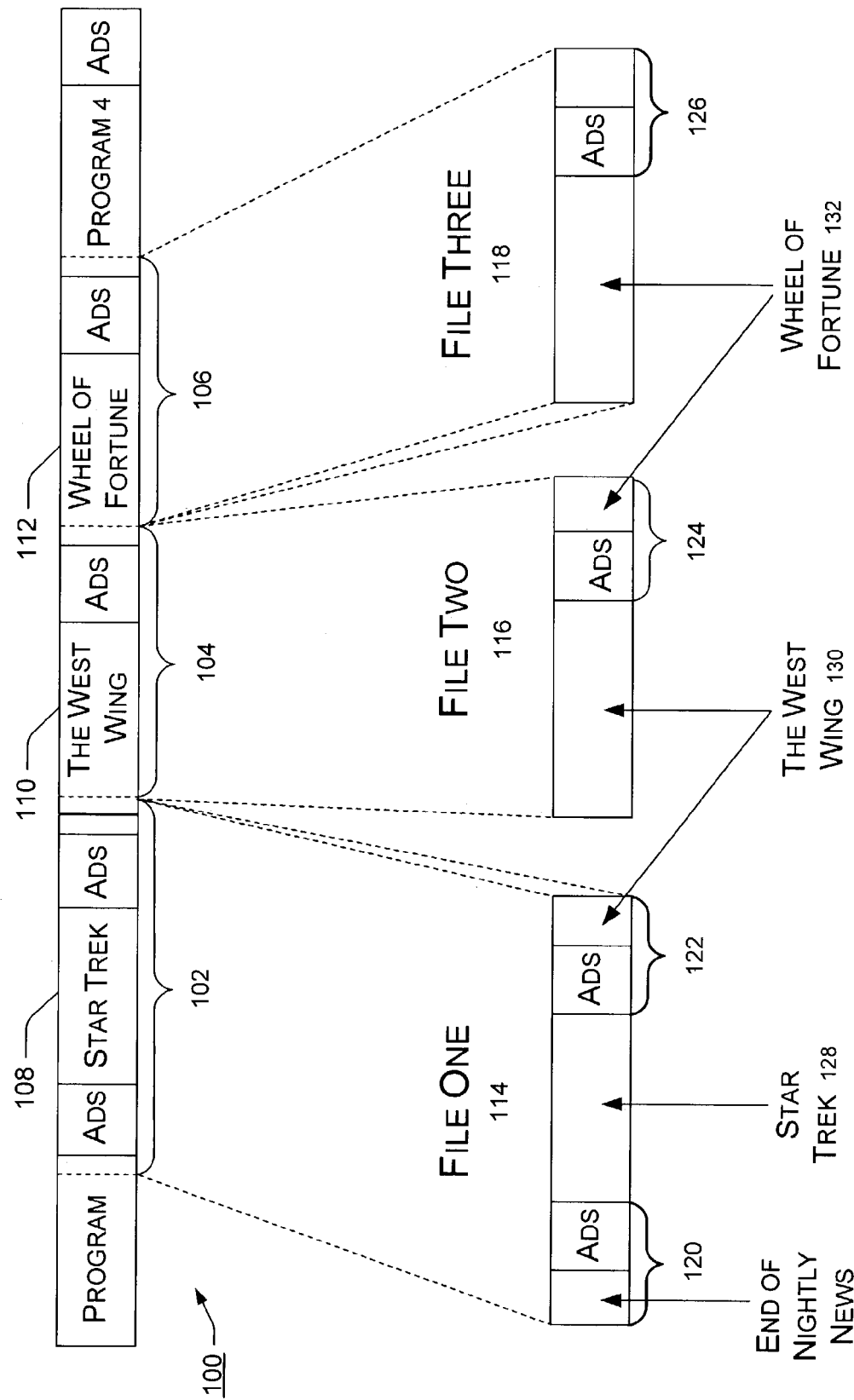
FIG. 1 is a graphic representation of conventional program padding during recording by a DVR.

As shown in FIG. 1, a conventional DVR receives a broadcast multimedia stream 100 and divides the multimedia stream into program segments 102, 104, 106. The DVR tries to store each program 108, 110, 112 in its own digital file 114, 116, 118. To avoid missing any of the content of a program, the DVR may pad the beginning and sometimes the ending of a program being recorded with a pre-pad 120 or a post-pad 122 (124, 126), respectively. Padding is a process of intentionally or unintentionally beginning recording slightly before an anticipated start time of a program (pre-pad) or ending the recording slightly after an anticipated finish time of the program (post-pad). The padding is intentional when applied as a safeguard against clock inaccuracies and/or broadcaster scheduling inaccuracies, especially ones that can cause a program to start at a different time than expected by a pre-programmed DVR. The padding is unintentional when the DVR makes a temporal division between two programs at the wrong time. Although intentional padding is intended to ensure that no program content is lost, the unintentional padding that occurs when programs are recorded back-to-back on a DVR that has only one tuner (or on a DVR that can control the recording of only one multimedia stream at a time) the unintentional padding of one program overlaps with the content of the next program.

In the case of back-to-back recordings, the inaccurate temporal division between programs results in the unintentional post-padding 122 of a first program, such "Star Trek" 128, which intrudes into a succeeding program, such as "The West Wing" 130, causing the succeeding program, "The West Wing" 130, to be fragmented, with a part of the program in two different digital files 114, 116. In a worst-case scenario, the unintentional padding problem proliferates as shown, for example, by the post-padding 124 of "The West Wing" 130 causing the succeeding program, "The Wheel of Fortune" 132 to also be stored across two different files 116, 118.

The subject matter herein describes an exemplary program integration engine (PI engine) and related methods of tracking programs divided across different digital files because of unintentional padding and other fragmentary processes during recording.

Exemplary Program Recording Environment

Figure 2:
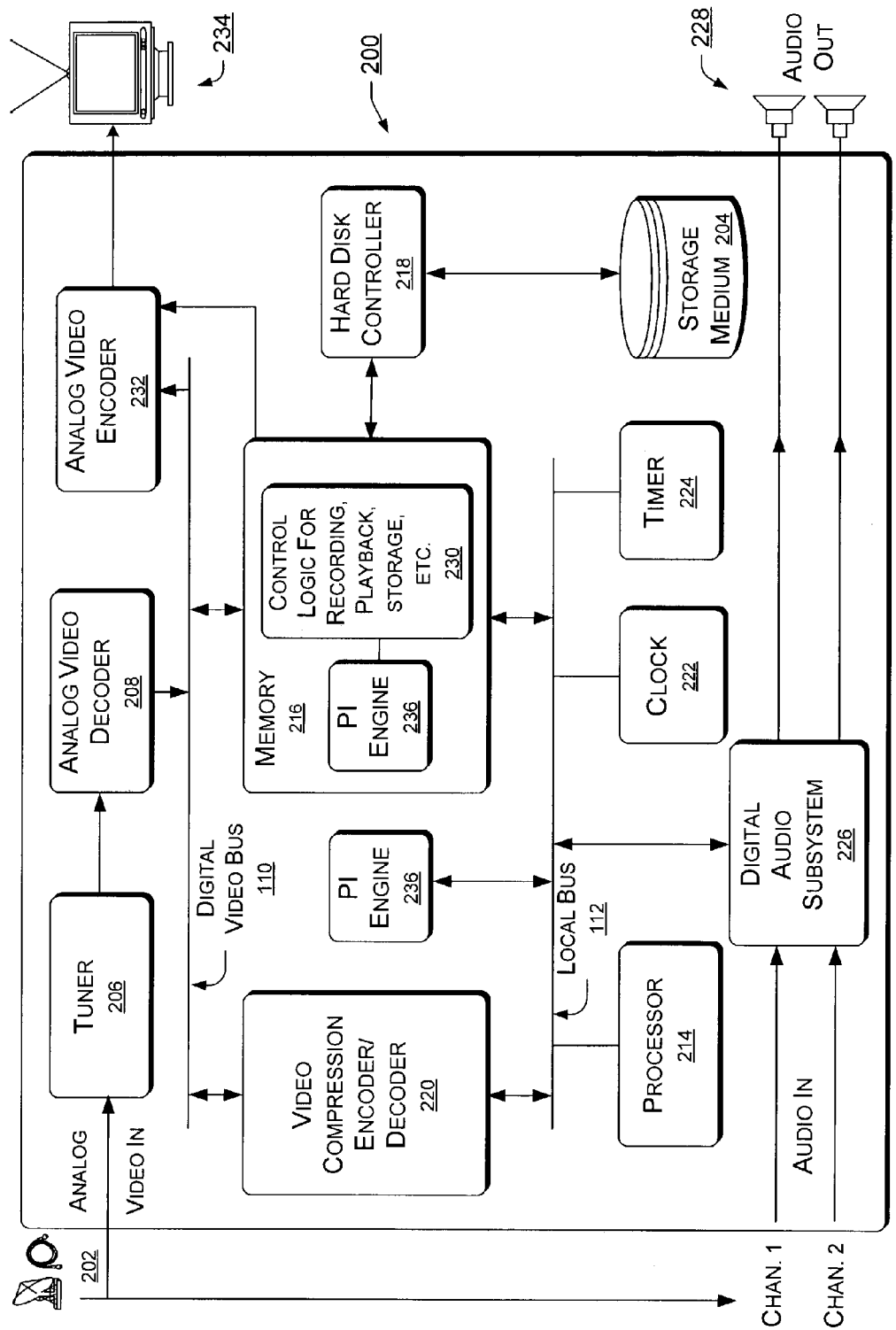
FIG. 2 is a block diagram of an exemplary DVR in which the subject matter can be practiced, including an exemplary program integration engine.

FIG. 2 shows an exemplary DVR 200 providing an illustrative environment for practicing the subject matter. In general, the exemplary DVR 200 receives programs via signal streams from a broadcasting source 202, typically an antenna, cable head-end, and/or satellite system, etc., and digitally records the programs after various conversions, on a storage medium 204.

The exemplary DVR 200 typically selects a channel from a whole head-end of programming channels using a tuner 206, an analog video decoder 208, a television card, etc. Of course, if the incoming program signal streams are digital to begin with, an analog to digital conversion is not necessary. A decoded analog signal or an incoming digital signal is fed to a digital video bus 210.

Besides the digital video bus 210, the exemplary DVR 200 also contains a local bus 212 that communicatively couples digital audio and video components with conventional computing device components, such as a processor 214, computer memory 216, such as random access memory, and a data storage controller, e.g., a hard disk controller 218 communicatively coupled with the storage medium 204. The local bus 212 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus. The digital video bus 210 and the local bus 212 share the services of the memory 216, and may also exchange video signals in compressed form via a video compression encoder/decoder 220. The local bus 212 is also typically communicatively coupled with a clock 222 and timer 224 and well as digital audio components, such as an exemplary stereo digital audio subsystem 226. The digital audio subsystem 226 may receive and decode the same multimedia stream(s) from the broadcast signal sources 202 as its video counterpart, and output stored or currently-being-received programs through speaker(s) 228.

The storage medium 204 can be a volatile or nonvolatile, removable or non-removable medium implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the exemplary DVR 200. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The memory 216 holds control logic 230 for recording, playback, storage, etc. of programs, and consequently the digital program content to be recorded, played back, and/or stored also uses the memory 216 as the main buffer and/or conduit between components and functions. Hence, the memory 216 maintains not only the aforementioned coupling with the hard disk controller 218, but also a direct communicative coupling with an analog video encoder 232 to send video output to a display 234. The memory 216 may include computer storage media in the form of volatile and/or nonvolatile memory such as read only memory and random access memory. A basic input/output system containing basic routines that help to transfer information between elements within the exemplary DVR 200, such as during start-up, and is typically stored in read only memory. The random access memory typically contains data and/or program modules, including the exemplary PI engine 236, that are immediately accessible to and/or presently being operated on by the processor 214.

The control logic 230, which may comprise and/or include an operating system or other applications, is communicatively coupled with an exemplary program integration engine (PI engine) 236, which may exist as software, as hardware, or as both hardware and software. The exemplary PI engine 236 is shown residing in memory 216 as software and attached to the local bus 212 as hardware. In one implementation, the exemplary PI engine 236 is an adjunct to convention control logic 230 for recording, playback, storage, etc. That is, the exemplary PI engine 236 can control aspects of recording, playback, and storage usually handled by the control logic 230, however, the exemplary PI engine 236 primarily performs program integration functions. Optionally, of course, the control logic 230 and the exemplary PI engine 236 can be combined into a single entity.

Exemplary Program Integration (PI) Engine

Figure 3:
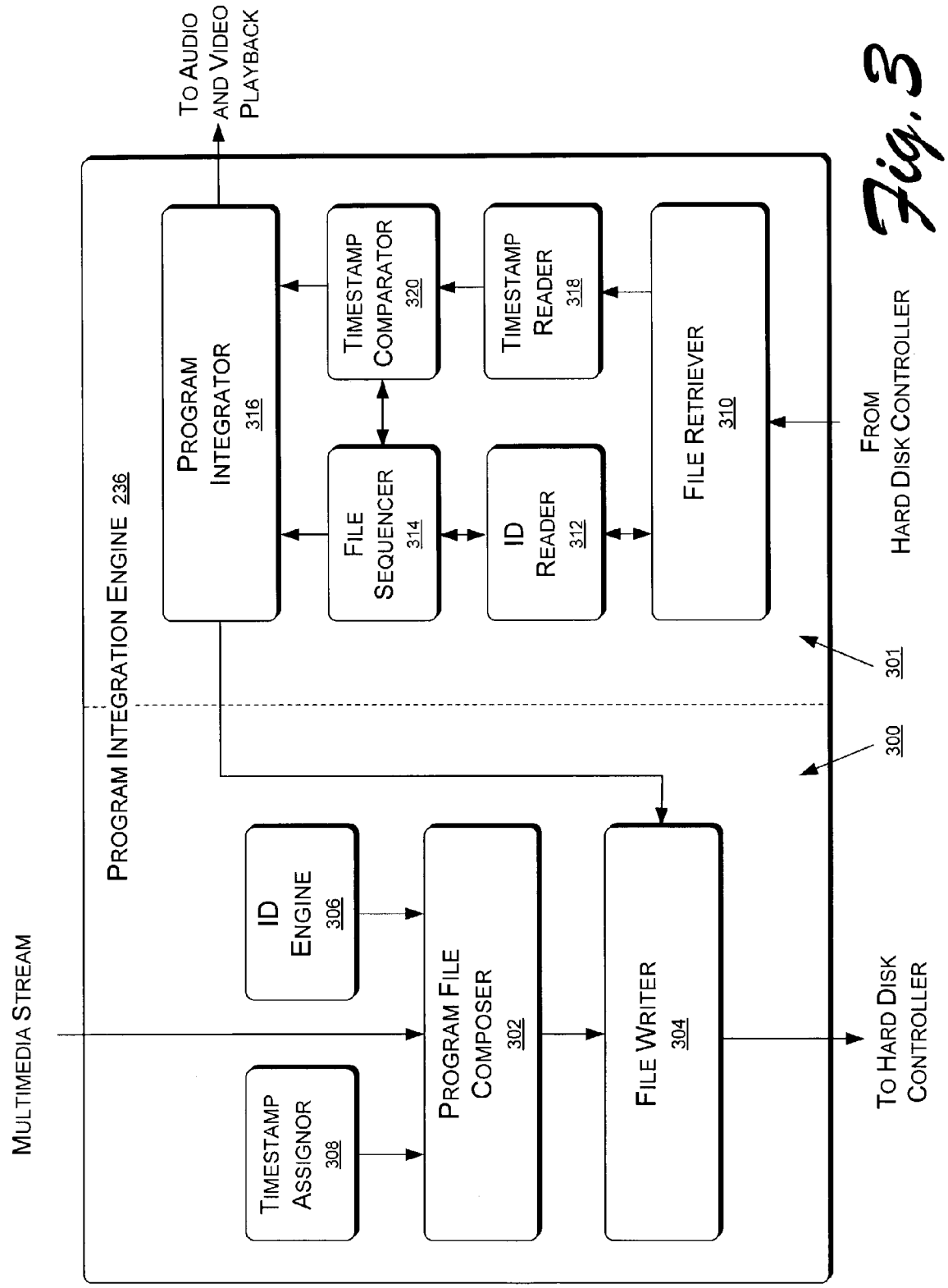
FIG. 3 is a block diagram of an exemplary program integration engine.

FIG. 3 shows the exemplary PI engine 236 in greater detail. In one exemplary implementation, the exemplary PI engine 236 is approximately divided into a file writing section 300 and a file retrieval section 301. In one implementation, the file writing section 300 includes a program file composer 302, a file writer 304, an ID engine 306, and a timestamp assignor 308 communicatively coupled as illustrated. The program file composer 302 generally receives a multimedia stream 100 from an audio and/or video broadcast source 202 and the file writer 304 generally writes a file containing at least a program fragment from the multimedia stream to the storage medium 204. The file writing section 300 of the exemplary PI engine 236 may contain additional or fewer components than in the exemplary PI engine 236 illustrated.

In one implementation, the file retrieval section 301 includes a file retriever 310, an ID reader 312, a file sequencer 314, and a program integrator 316, communicatively coupled as illustrated. A timestamp reader 318 and a timestamp comparator 320 may also be included in the file retrieval section 301 of the exemplary PI engine 236. The file retrieval section 301 of the exemplary PI engine 236 may contain additional or fewer components than in the exemplary PI engine 236 illustrated.

The exemplary PI engine 236 receives a multimedia stream comprising all (or part) of a program from a broadcast source 202. The multimedia stream is passed to a program file composer 302, which generally tries to place one program from the multimedia stream into one digital file ("file"). The ID engine 306 assigns one or more identifiers to the metadata for each program and/or file composed, for example in a file header. The ID engine 306 may name the file and/or assign a key to the file so that the file can be retrieved for playback or other purposes by the name of the program occupying most of the file. The naming function may also be performed by the control logic 230. Besides associating a program name with the file, the ID engine 306 assigns one or more identifiers to each file.

The identifier may be a number or alphanumeric tag that can be added, for example, to the file or to a file header and used to retrieve the file. The identifier may also be a unique identifier, such as a 128-bit globally unique identifier (GUID) or other number with a vanishing low probability of being duplicated. GUIDs are very useful as identifiers because files can be transferred between DVRs without fear that GUIDs from one system will duplicate the GUIDs on the other system. Accordingly, the files from one DVR may be used immediately by another DVR having an exemplary PI engine 236. An identifier may also be a filename of a temporally preceding file, a tag or hash that points to file contents, a unique alphanumeric identifier, a number from a sequence of numbers, and/or a timestamp or combination of timestamps etc. that point to a program fragment. All these types of identifiers have the common property of pointing to program fragments, for example, by reconstructing the sequence in which multiple files were recorded. As mentioned, the identifiers may also have the property of uniqueness, so that no two identifiers can be confused with each other.

In one implementation of the subject matter, the assigned identifiers of multiple files are used to establish the sequence in which stored files were originally recorded by the exemplary DVR 200. This can be accomplished by assigning sequential identifiers to files as they are recorded, or, by storing on a file the identifier of the immediately preceding file, e.g., in addition to the file's own identifier. In a variation, the assigned identifiers of both the preceding and succeeding files may be stored on a file. A file, after assigning of an identifier and possibly the identifiers of preceding and succeeding files by the ID engine 306, is passed to the file writer 304 for storage on the storage medium 204 via the hard disk controller 218 or other media control mechanism.

When a program is divided across two (or more) files because of intentional or unintentional padding during recording, part of the program is typically lost, or at least cannot be retrieved conventionally. But the bulk of the program typically resides in the file bearing the program's name. The exemplary PI engine 236 can use the assigned identifiers for retrieving and reassembling parts of a program divided across multiple files for a playback of an entire program, even when conventionally the beginning part of a desired program is in the padding of another program on another file.

In the file retrieval section 301, the file retriever 310 obtains a stored file from the storage medium 104, usually retrieving via the program's name. The ID reader 312 reads the identifier stored on the retrieved file, and if the identifiers have been assigned to the files in numerical sequence, then the file sequencer 314 can initiate the retrieval of a temporally adjacent file by calling up the file with the next identifier in the numerical sequence. Alternatively, if the sequence numbers are generated randomly, then if the ID engine 306 has stored the identifier(s) of the preceding and/or succeeding files on the retrieved file, the file sequencer 314 can initiate retrieval of part of a program from a preceding (and/or succeeding) file. In other words, the PI engine 236 has the capability to reconstruct the order in which files were created for retrieving and reassembling programs spread across multiple files. The program integrator 316 reassembles a program by calling up stored and/or retrieved program parts to combine in correct temporal sequence. The reconstituted program can then be passed either to the analog video encoder 232 for presentation on a display 234 and speakers 228, etc., or passed to the file writer 304 as a complete program to be written to a single file.

Thus, in one implementation of the subject matter, the exemplary PI engine 236 can retrieve a program divided across multiple files, sequence the parts, and rewrite the program to file on the storage medium 204 to defragment the stored program. Optionally, the exemplary PI engine 236 only performs this defragmentation of a stored program automatically when the program is retrieved the first time from the storage medium 204. In another variation, the exemplary PI engine 236 has the capability to scan all files from a recent recording session, a recent time interval, or the entire disk, and rewrite all programs that are divided across multiple files into their own files (i.e., defragmentation).

In order to for the exemplary PI engine 236 to integrate the fragments of programs divided across multiple files into a seamless program for playback or rewriting as a defragmented file, several mechanisms are available to determine how much of a program is in a particular file, that is, to determine how large a particular program fragment is.

In one exemplary implementation, the duration of the padding applied before the beginning of a program or after the end of a program is known, that is, pre-selected, pre-programmed, and/or constant. In this case, program fragment in a preceding file is assumed to be the duration of the padding. If the padding duration is five minutes, then the PI engine 236 plays back the last five minutes of the preceding file as the beginning of the current program selection. Storing timestamps in the program metadata that resides in a file (or file header) may yield even more accurate results, as will be discussed below.

In one exemplary implementation, the exemplary PI engine 236 optionally includes a timestamp assignor 308 in the file creation section 300 to determine, for example, program start times, program finish times, file start times, and file finish times. The timestamp assignor 308 then stores one or more of these times in each file, for example in the file header. A program start time, for example, is the time of day that a program is broadcast, or in other words, the time of day that the start of the program began to be available for recording. The program start time is typically determined from schedule listing information broadcast with the program content but could be calculated using other means, such as adding up program durations from an initial program start time of a block of program data. A file start time, on the other hand, is the time of day that the DVR began recording the program. Because of pre-padding, when a single program is solely recorded, the file start time is typically earlier than the program start time. The timestamp assignor 308 can be complemented with a timestamp reader 318 in the file retrieval section 301 of the exemplary PI engine 236 and a timestamp comparator 320 to determine time intervals between different types of timestamps. The timestamp comparator 320 is communicatively coupled with the file sequencer 314 to pass program fragment sizes (as measured in time units) to the file sequencer 314 for the task of reassembling a program from fragments.

Figure 4:
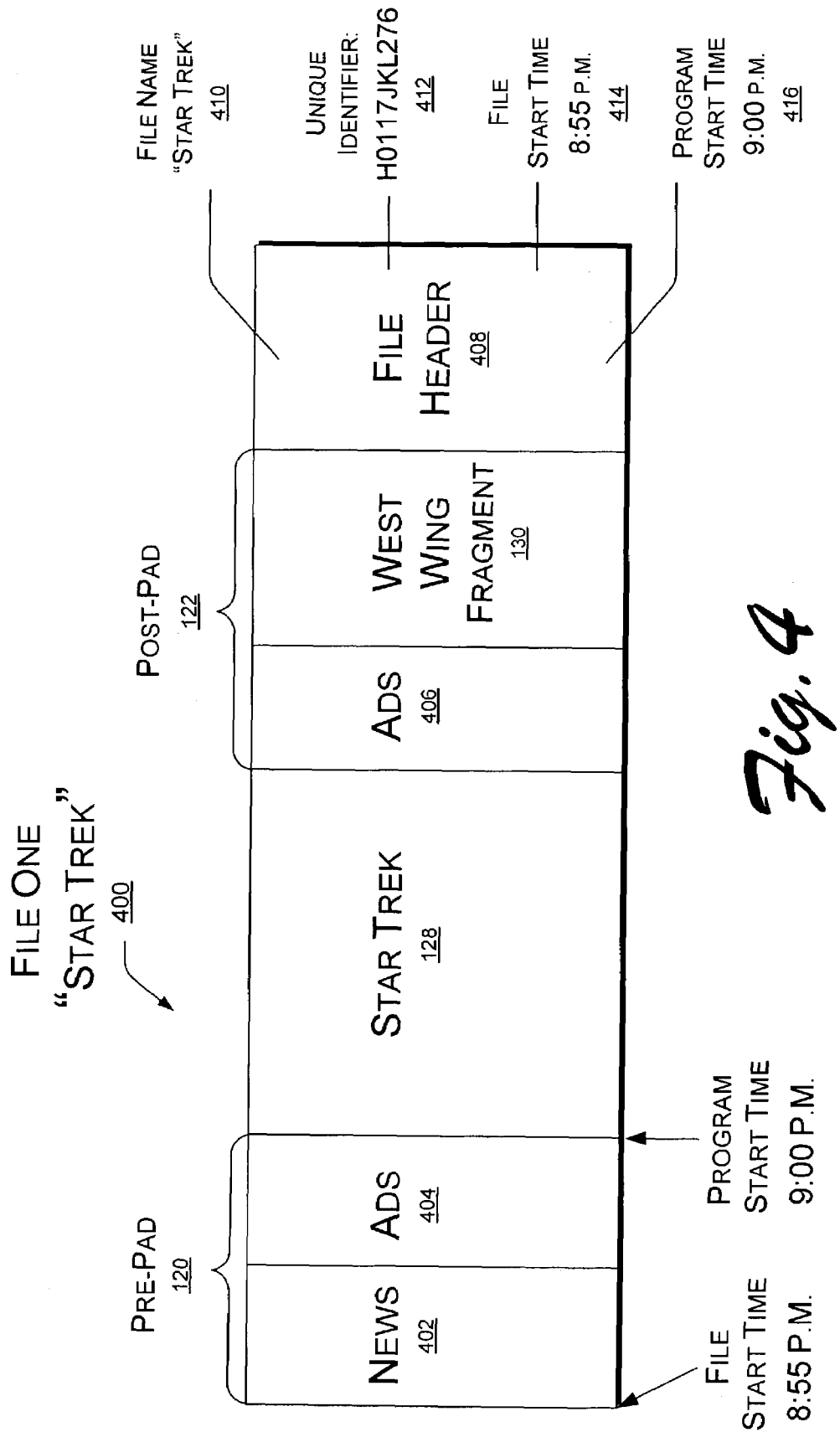
FIG. 4 is a graphic representation of a file having exemplary metadata, according to one aspect of the subject matter.

FIG. 4 shows a file 400 that includes various program fragments. The various timestamps 414, 416 stored in the file 400 can be used to determine program fragment sizes (lengths, intervals, etc.). A news program fragment 402 and an advertisement fragment ("ads") 404 make up a pre-pad 120 for the program "Star Trek" 128. "Star Trek" 128 is the "main" program in the file 400, i.e., the program that the exemplary DVR 200 was recording to create the file 400. The file 400 is thus named "Star Trek" and may be retrieved by the control logic 230 and/or the exemplary PI engine 236 via that name. A post-pad 122 includes more ads 406 and part of the succeeding program, "The West Wing" 130. A file header 408 may contain various elements, such as the file name 410 ("Star Trek"), one or more identifiers 412 to identify the file's place in a sequence, and one or more timestamps, such as a file start time 8:55 pm (414) and a program start time 9:00 pm (416).

When the timestamp reader 318 reads the header 408 of the file 400 retrievable by the name "Star Trek" and passes the timestamp information to the timestamp comparator 320, the exemplary PI engine 236 can determine if the beginning of the program (Star Trek) is in the instant file 400 or in some other file. Since the file start time 414 is earlier than the program start time 416, the beginning of Star Trek is in the instant file 400.

Figure 5:
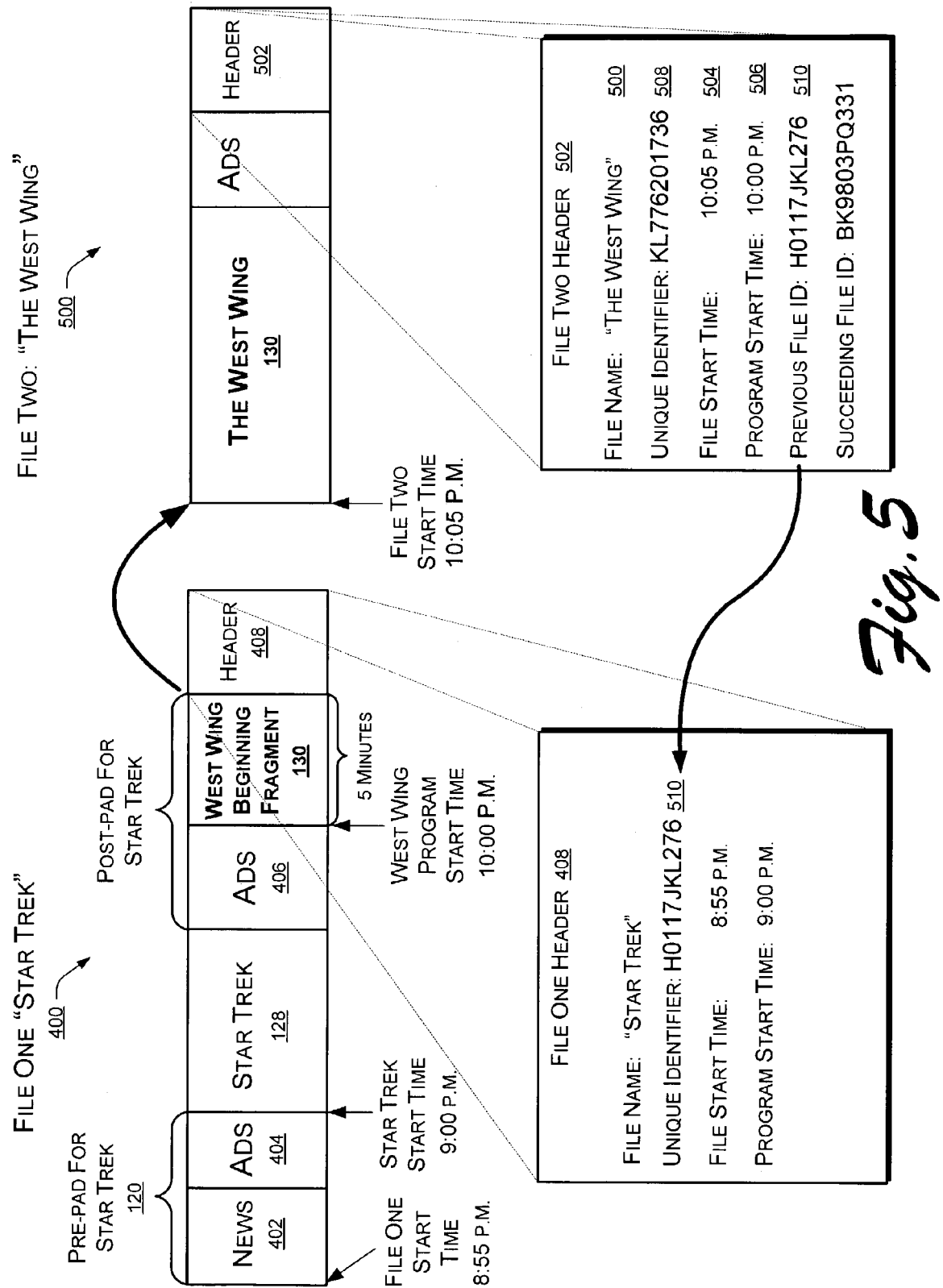
FIG. 5 is a graphic representation of an exemplary integration of program fragments, according to one aspect of the subject matter.

FIG. 5 shows two temporally adjacent files 400, 500 recorded in a temporal sequence. File one 400 was recorded first, and since the two programs "Star Trek" 128 and "The West Wing" 130 were broadcast back-to-back, a fragment of "The West Wing" 130 is in the post-pad 122 of file one 400 nominally containing "Star Trek" 128.

In one exemplary implementation, when the user actuates a playback of "The West Wing" 130, the timestamp reader 318 of the exemplary PI engine 236 reads timestamps stored, e.g., in the header 502 of "The West Wing" 130 and passes the timestamp information to the timestamp comparator 320. Since the file start time 504 for file two 500 is 10:05 pm, i.e., after the program start time 506 of "The West Wing" 130 (i.e., 10:00 pm), the timestamp comparator 320 determines the difference between the program start time 506 and the file start time 504 and passes this information to the file sequencer 314. The file sequencer 314 calls the ID reader 312 to read the identifier of file two 500 from its header 502, and if identifiers are assigned in a numerical sequence, then the PI engine 236 calls the file retriever 310 to read the file having an adjacent identifier number in the numerical sequence. This retrieves the file 400 that was recorded immediately before file two 500. Alternatively, if the identifiers are random numbers, then the timestamp reader 318 may read the preceding file's identifier 510 from the header 502 of file two 500 ("The West Wing" 130). The file retriever 310 then obtains file one 400 ("Star Trek") for retrieval of the beginning fragment of "The West Wing" 130. Since the PI engine 236 now possesses "The West Wing" program start time 506 (10:00 pm), and the file two start time 504 (10:05 pm), as well as the duration of the fragment of "The West Wing" (i.e., 10:05 pm–10:00 pm=5 minutes), the PI engine 236 knows how far back in file one 400 to start reading the beginning fragment of "The West Wing." The program integrator 316, or other exemplary components in the PI engine 236, reads the last five minutes of file one 400 to obtain the beginning of "The West Wing" 130 for playback or rewriting. If the PI engine 236 is rewriting the program, it sends the fragments in order or with ordering information to the file writer 304 to write a defragmented version of "The West Wing" 130 in a single file bearing that name.

Exemplary Methods

Figure 6:
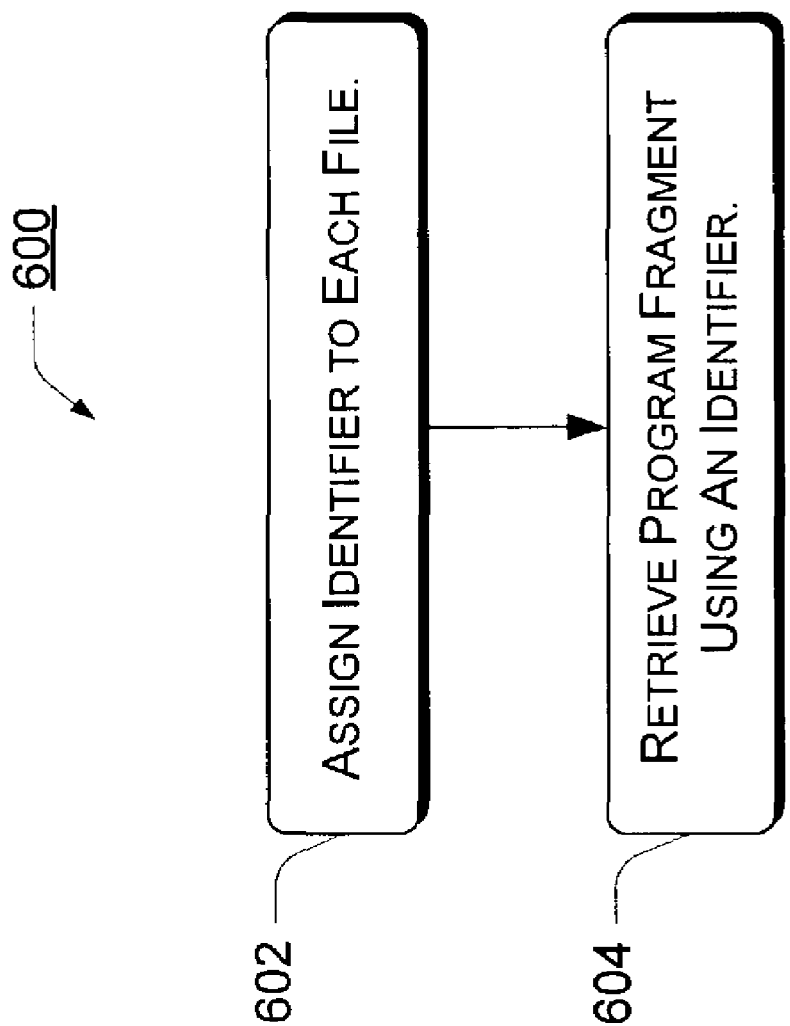
FIG. 6 is a flow diagram of an exemplary method of cross-file digital video playback.

FIG. 6 shows an exemplary method 600 of cross-file digital video playback. This exemplary method 600 can be performed by a device, such as the exemplary DVR 200 shown in FIG. 2 or the exemplary PI engine 236 shown in FIGS. 2 and 3. In the flow diagram, the operations are summarized in individual blocks. The operations may be performed in hardware and/or as machine-readable instructions (software or firmware) that can be executed by a processor.

At block 602, identifiers are assigned to files having program fragments. The identifier(s) assigned to each file may be a filename of a temporally preceding file, a tag or hash that points to file contents, a unique alphanumeric identifier, such as a GUID, a number from a sequence of numbers, a timestamp or combination of timestamps etc. that point to a program fragment. The files have been created by a multimedia recording process that for one reason or another, such as padding, divides at least some of the programs across multiple files.

At block 604, program fragments are retrieved using the identifiers. In one exemplary implementation, the method includes reading a identifier of a temporally preceding file as well as a file start time and program start time stored in the file. The identifier allows access to the preceding file containing the program fragment and the difference between the program start time and the file start time indicates how large of a program fragment is to be retrieved and possibly its location in the preceding file. Of course, the same method applies to program fragments in succeeding files or in randomly dispersed files.

Figure 7:
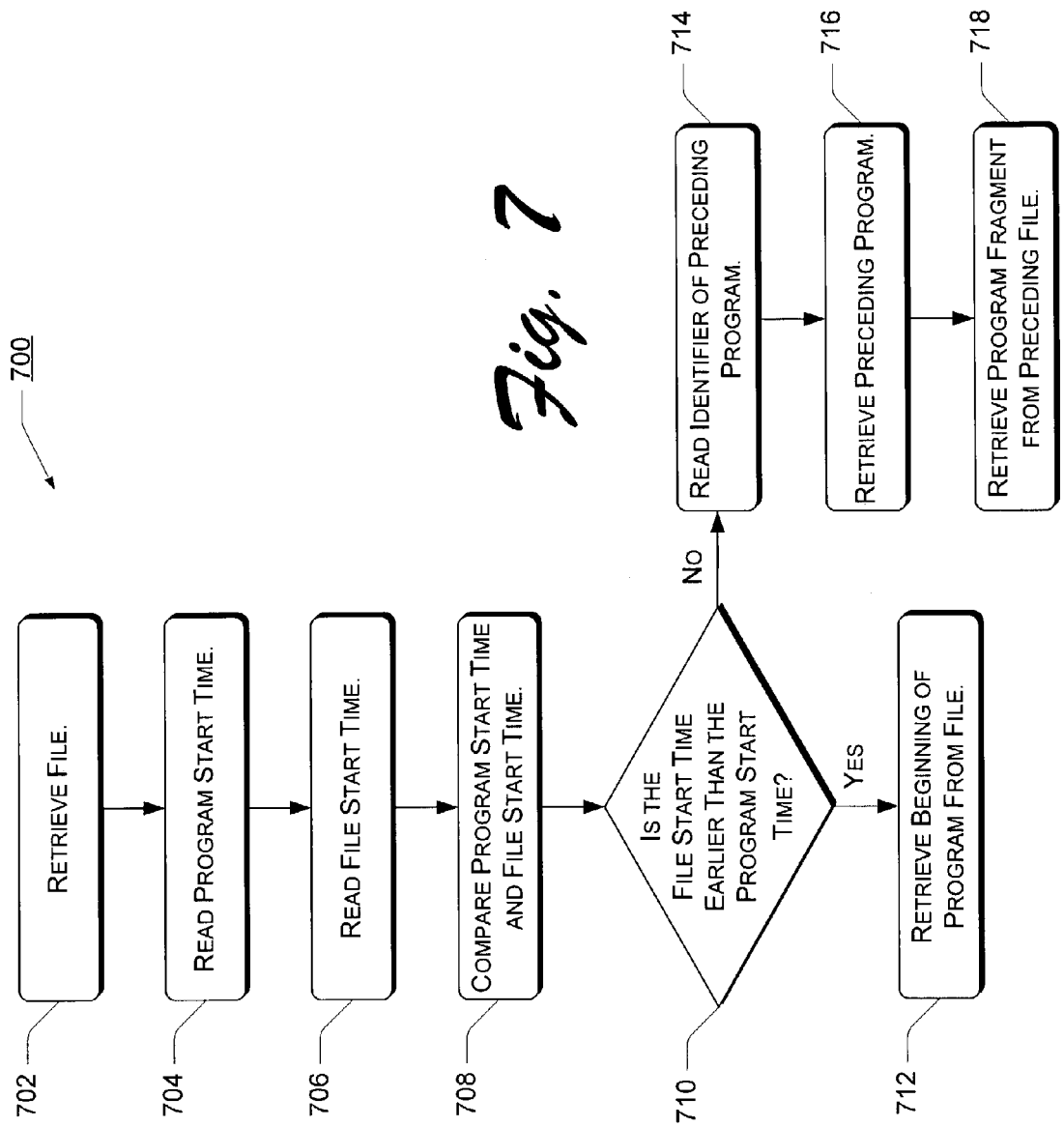
FIG. 7 is a block diagram of another exemplary method of cross-file digital video playback.

FIG. 7 shows another exemplary method 700 of cross-file digital video playback. This exemplary method 700 can be performed by a device, such as the exemplary DVR 200 shown in FIG. 2 or the exemplary PI engine 236 shown in FIGS. 2 and 3. In the flow diagram, the operations are summarized in individual blocks. The operations may be performed in hardware and/or as machine-readable instructions (software or firmware) that can be executed by a processor.

At block 702, a file is retrieved. The file may be retrieved by name, the name usually designating a program stored in the file.

At block 704, the program start time of a program stored in the file is read.

At block 706, the file start time is read.

At block 708, the program start time and the file start time are compared.

At block 710, if the file start time is earlier than the program start time, then the method branches to block 712.

At block 712, the beginning of the program is retrieved from the file.

Back at block 710, if the file start time is later than the program start time then the method branches to block 714.

At block 714, an identifier of a preceding file is read from the file.

At block 716, the preceding file is retrieved.

At block 718, a fragment of the program, e.g., corresponding to the difference between the program start time and the file start time, is retrieved from the preceding file.

CONCLUSION

The foregoing describes cross-file record padding playback. It should be noted that the subject matter described above can be implemented in hardware, in software, or in both hardware and software. In certain implementations, the exemplary DVR 200, the exemplary PI engine 236, and/or related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method, comprising:
assigning an identifier to each of a temporal sequence of files, wherein each file contains at least a part of a multimedia stream and each identifier is used to identify adjacent multimedia streams recorded from the same tuner, each multimedia stream containing one or more program fragments;
storing a program start time in each file, wherein the program start time indicates the time of first receiving a program or the broadcast start time of the program;
storing a file start time in the file, wherein the file start time indicates a time of receiving an earliest part of an earliest program fragment in the file;
retrieving a file containing a multimedia stream part that contains a fragment of a program;
using one of the assigned identifiers to retrieve an adjacent multimedia stream part to retrieve a program fragment stored in a different file, including:
reading the program start time;
reading the file start time;
comparing the program start time and the file start time;
if the file start time is later than the program start time, then reading the identifier of the preceding file and retrieving a preceding program fragment stored in the preceding file, wherein the time length of the preceding program fragment corresponds to the difference between the program start time and the file start time; and
if the file start time is not later than the program start time then retrieving the program from the file.

2. The method as recited in claim 1, wherein the identifier is a 128-bit globally unique identifier (GUID) to make a file uniquely identifiable from files in other temporal sequences of files.

3. The method as recited in claim 1, wherein at least one identifier is used to retrieve multiple files from the sequence of files to retrieve program fragments stored in different files.

4. The method as recited in claim 3, wherein the identifier assigned to a file is stored in metadata for a program fragment stored in the file or metadata for the file stored in the file.

5. The method as recited in claim 4, wherein the file stores an identifier of a preceding file in the metadata.

6. The method as recited in claim 4, wherein the file stores an identifier of a succeeding file in the metadata.

7. The method as recited in claim 4, wherein the file is assigned a name of one of the program fragments stored in the file.

8. The method as recited in claim 7, further comprising retrieving the file using the name and retrieving the program fragment having the name from the file.

9. The method as recited in claim 8, further comprising retrieving program fragments from multiple files, wherein a first program fragment is retrieved from the file and a preceding program fragment is retrieved from a preceding file using the identifier of the preceding file or a succeeding fragment is retrieved from a succeeding file using the identifier of the succeeding file.

10. The method as recited in claim 1, further comprising combining retrieved program fragments according to the sequence and playing back the program on a display.

11. The method as recited in claim 1, further comprising combining the retrieved program fragments according to the sequence and storing a complete version of the program in a file.

12. The method a recited in claim 11, further comprising scanning a storage medium for program fragments in different files and converting the program fragments into complete versions of programs stored in one file apiece.

13. An apparatus, comprising:
a means for receiving a multimedia stream;
a means for storing the multimedia stream as program fragments in multiple files; and
a program integration engine to combine the program fragments into a program;
wherein the program integration engine compares a program start time of a first program fragment with a file start time of a file;
if the file start time is later than the program start time, then the program integration engine reads the identifier of a preceding file and retrieves a preceding program fragment stored in the preceding file, wherein the time length of the preceding program fragment corresponds to the difference between the program start time and the file start time; and
if the file start time is not later than the program start time then the program integration engine retrieves the first program fragment from the file.

14. The apparatus as recited in claim 13, wherein the means for receiving a multimedia stream is a digital recording device having a tuner.

15. The apparatus as recited in claim 13, wherein the means for receiving a multimedia stream is a digital recording device having an analog video decoder.

16. The apparatus as recited in claim 13, wherein the means for receiving a multimedia stream is a computing device having a television card.

17. The apparatus as recited in claim 13, wherein the means for storing is a digital recording device having a hard disk.

18. The apparatus as recited in claim 13, wherein the means for storing is a computing device having a hard disk.

19. The apparatus as recited in claim 13, wherein the program integration engine assigns an identifier to each digital file having a program fragment.

20. The apparatus as recited in claim 19, wherein the identifier is a globally unique identifier (GUID).

21. The apparatus as recited in claim 19, wherein the program integration engine assigns identifiers to digital files in a numeric sequence.

22. The apparatus as recited in claim 19, wherein the program integration engine stores in each digital file an identifier of a temporally adjacent digital file, wherein two digital files are temporally adjacent if they contain program fragments temporally adjacent to each other.

23. The apparatus as recited in claim 19, wherein the program integration engine establishes a temporal sequence of program fragments using one or more of the identifiers.

24. The apparatus as recited in claim 19, further comprising a timestamp assignor for including a program start time and a file start time in a digital file.

25. The apparatus as recited in claim 24, further comprising a timestamp comparator to obtain a difference between the program start time and the file start time.

26. The apparatus as recited in claim 25, further including a file sequencer to retrieve a temporally adjacent program fragment having a duration corresponding to the difference between the program start time and the file start time.

27. A program integration engine, comprising:
a means for establishing a sequence of digital files containing program fragments, wherein the sequence of the digital files corresponds to the temporal order of the program fragments when combined to make programs; and
a file sequencer to retrieve the program fragments according to the established sequence;
wherein the program integration engine compares a program start time of a first program fragment with a file start time of a file;
if the file start time is later than the program start time, then the program integration engine reads the identifier of a preceding file and retrieves a preceding program fragment stored in the preceding file, wherein the time length of the preceding program fragment corresponds to the difference between the program start time and the file start time; and
if the file start time is not later than the program start time then the program integration engine retrieves the first program fragment from the file.

28. The program integration engine as recited in claim 27, further comprising an ID engine to assign identifiers to digital files to establish the sequence.

29. The program integration engine as recited in claim 28, wherein the ID engine assigns globally unique identifiers (GUIDs).

30. The program integration engine as recited in claim 28, wherein the ID engine assigns to a first digital file an identifier of a second digital file containing a program fragment temporally adjacent to the program fragment in the first digital file.

31. The program integration engine as recited in claim 28, further comprising a means for assigning a timestamp, wherein the timestamp is one of a file start time and a program start time.

32. The program integration engine as recited in claim 31, further comprising a timestamp comparator, wherein the comparator compares two timestamps to determine if a program fragment is related to another program fragment in another digital file.

33. The program integration engine as recited in claim 32, wherein the timestamp comparator determines a duration of a program fragment by determining the time difference between two timestamps.

34. One or more computer readable media containing instructions that are executable by a computer to perform actions comprising:
storing program segments from a multimedia stream across multiple digital files;
establishing a sequence of the digital files according to an order of the program segments in the multimedia stream;
retrieving a digital file containing a first program segment; and
retrieving a second program segment adjacent to the first program segment according to the order using an adjacent digital file in the sequence;
comparing a program start time of a first program fragment with a file start time of a file;
if the file start time is later than the program start time, then reading the identifier of a preceding file and retrieving a preceding program fragment stored in the preceding file, wherein the time length of the preceding program fragment corresponds to the difference between the program start time and the file start time; and
if the file start time is not later than the program start time then retrieving the first program fragment from the file.

35. The one or more computer readable media as recited in claim 34, further comprising establishing a sequence by assigning identifiers to the digital files.

36. The one or more computer readable media as recited in claim 35, wherein the identifiers are globally unique identifiers (GUIDs).

37. The one or more computer readable media as recited in claim 35, further comprising assigning an identifier pointing to a temporally adjacent digital file, wherein a first digital file is temporally adjacent to a second digital file if the first and second digital files contain temporally adjacent program segments.

* * * * *